United States Patent [19]

Burke, Sr. et al.

[11] Patent Number: 4,550,602
[45] Date of Patent: Nov. 5, 1985

[54] LIQUID LEVEL MARKER FOR CONTAINER

[76] Inventors: William L. Burke, Sr., 1701 W. Brandon Blvd., Brandon, Fla. 33511; Elwood Marple, 317 - 34th Ave. N., #109, St. Petersburg, Fla. 33704; A. Eileen Suisman, 1004 Warwick Ct., Sun City Center, Fla. 33570

[21] Appl. No.: 609,323

[22] Filed: May 11, 1984

[51] Int. Cl.[4] .............................................. G01F 19/00
[52] U.S. Cl. ................................ 73/428; 33/126.7 A; 116/227
[58] Field of Search ...................... 73/427, 428, 290 R, 73/290 B; 33/126.7 R, 126.7 A; 116/227; 422/58, 99

[56] References Cited

U.S. PATENT DOCUMENTS

| 952,867 | 3/1910 | Bergeron | 33/126.7 A |
|---|---|---|---|
| 1,528,539 | 3/1925 | Fleckenstein | 73/428 |
| 2,801,541 | 8/1957 | Moreland | 73/428 |
| 3,672,061 | 6/1972 | Alessi | 73/428 |

FOREIGN PATENT DOCUMENTS

| 18468 | 8/1912 | United Kingdom | 73/427 |
|---|---|---|---|
| 816365 | 7/1959 | United Kingdom | 33/126.7 R |

Primary Examiner—Charles Frankfort
Attorney, Agent, or Firm—Frijouf, Rust & Pyle

[57] ABSTRACT

A device is disclosed for visually sighting the level of a liquid material or a solid particulate material within a container having a container sidewall. The device comprises a handle and a first and a second leg, the first leg having a first top end portion and a first bottom end portion with the second leg having a second top end portion and a second bottom end portion. The first and second top end portions are integrally connected to the handle and spaced apart to accommodate the thickness of the container sidewall. The first and second bottom end portions are spaced apart a distance closer than the first and second top end portions. First and second legs are resilient, enabling the bottom end portions to be separated upon positioning the first and second legs on the external and internal surfaces of the container sidewall with the resiliency of the legs engaging the external and internal surfaces of the container sidewall to maintain the position of the device relative to the container. A first and a second foot attached to the first and second legs respectively provide a line external and internal the container for enabling the operator to determine the level of the material within the container.

7 Claims, 5 Drawing Figures

LIQUID LEVEL MARKER FOR CONTAINER

BACKGROUND OF THE INVENTION

1. Field of the Invention

This invention relates to measurement and testing and more particularly to a device for visually sighting the level of a material within a container.

2. Information Disclosure Statement

Various devices have been proposed in the prior art for facilitating the measurement of a material within a container. In a transparent container, difficulty is sometimes encountered in measuring the material level within the container. This difficulty is encountered for various reasons intrinsic to the physical properties of most liquids and particulate solids and the physical and optical characteristics of transparent containers. Most liquids such as water have a large surface tension which creates a meniscus such that the exact level of the liquid within the container is not readily determinable. Second, errors of refraction occur when the line of sight of the operator is not coincident with a line normal to the sidewall of the container. Third, many containers having markings etched in the sidewall thereof which are difficult to read or may be misread due to the inadvertence of the operator.

To overcome the aforementioned difficulties, various provisions have been proposed in the prior art for aiding or assisting the operator in overcoming one or more of the aforementioned difficulties. J. S. Elliot in U.S. Pat. No. 379,692 disclosed a milk gauge consisting of a first and a second section interconnected by a sliding linkage for placement horizontally within a milk can to determine the level therein upon the milk reaching the level of the horizontal member disposed within the container.

P. L. Hexter disclosed in U.S. Pat. No. 2,098,963 a surface contact gauge for liquids wherein a support is affixed to the outer rim of a container for adjustably holding a blade having a knife edge at the lower periphery thereof and extending within the container wherein the level of the liquid in the container could be determined upon the liquid level contacting the knife edge.

E. E. Wilcox in U.S. Pat. No. 2,671,963 disclosed a device for measuring the level of liquid within a container incorporating an assemblable measuring device made of sheet material for providing a horizontal surface of variable height within the container to determine the level of the liquid within the container upon the liquid contacting a horizontal surface.

U.S. Pat. No. 2,695,453 to E. L. Valentine teaches the use of a dip stick liquid measuring apparatus incorporating a blade having a scale thereon which is supported by a blade guide fixably attached to the inner wall of a container.

U.S. Pat. No. 2,801,541 to B. S. Moreland discloses a float type attachment for drink receptacles wherein a panel is positioned between the inner and outer surfaces of a liquid container and supported by a shoulder engaging the top of the drinking receptacle. A float is slidably positioned within the container for measuring the liquid level therein.

U.S. Pat. No. 2,966,879 to J. W. Farrell relates to a liquid level indicator for a tank incorporating a first and a second eye member for positioning a descending rod within the container to be perpendicular to the container irrespective of the physical position of the container.

U.S. Pat. No. 3,512,862 to P. H. C. Yin discloses a reader for scales wherein a rectangular plastic transparent member is affixed to the outer periphery of a burette having units of a scale thereon for comparison with the level of liquid within the container.

U.S. Pat. No. 3,672,061 to Frank A. Alessi discloses a device for measuring the amount of fluid remaining in a transparent container by positioning scribe lines on a slidable pointer in alignment with the fluid level within the container. The scale is affixed to the inner surface of the container by double-sided tape.

U.S. Pat. No. 4,024,644 to Koenig, et al. discloses a gauge for determining the head space of a liquid filled container composed of a flat bar of transparent material having a series of probes progressively decreasing in length and extending downwardly from the lower edge of the bar. The probes have a beveled edge for providing a dark spot within the transparent material when the probe is in contact with the liquid within the container.

Although the foregoing inventions have contributed substantially to the measurement art, none of the aforementioned devices have solved the needs and eliminated the problems of refraction and proper sighting of a material within a container by use of a simple and economical device.

Therefore, it is an object of this invention to provide an apparatus which overcomes the aforementioned inadequacies of the prior art devices and provides an improvement which is a significant contribution to the advancement of the container measuring art.

Another object of this invention is to provide a device for visually sighting the level of a material within a container having a container sidewall incorporating a first and a second leg which are resiliently affixed to a handle in a converging relationship, enabling the resiliency of the first and second legs to grasp the external and internal surfaces of the container sidewall for maintaining the position thereon.

Another object of this invention is to provide a device for visually sighting the level of a liquid within a container having a transparent container sidewall wherein the first and second legs incorporate a first and a second foot for providing a line of sight external and internal the container for enabling the operator to determine the level of the liquid internal the container upon sighting along the first and second feet through the transparent container sidewall, thus eliminating refractive error.

Another object of this invention is to provide a device for visually sighting the level of a material within a container having a container sidewall wherein the position of the device relative to the container sidewall may be adjusted prior to filling the container with a material for providing the proper height therein or for installation on the container sidewall after the material is present within the container.

Another object of this invention is to provide a device for visually sighting the level of a material within a container having a container sidewall which can accommodate a large variety of container sidewall thicknesses and levels within the container.

Another object of this invention is to provide a device for visually sighting the level of a material within a container having a container sidewall which is constructed of an integral and unitary plastic material.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment, in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention may be incorporated into a device and method for visually sighting the level of a liquid material or a solid particulate material within a container having a container sidewall comprising a handle and a first and second leg. The first leg has a first top end portion and a first bottom end portion, whereas the second leg has a second top end portion and a second bottom end portion. The first and second top end portions are integrally connected to the handle and spaced apart a distance to accommodate the thickness of the container sidewall. The first and second legs extend from the handle in a converging relationship, establishing the first and second bottom end portions to be spaced apart a distance closer than the first and second top end portions.

The invention includes a first and a second foot integrally connected to the first and second bottom end portions and extending substantially perpendicular to the first and second legs respectively. The first and second legs are resilient, enabling the first and second bottom end portions to be separated upon the first and second legs being positioned on the external and internal surfaces of the sidewall of the container. The resiliency of the first and second legs enable the first and second bottom end portions to resiliently engage the external and internal surfaces of the sidewall of the container to maintain the position of the first and second bottom end portions relative to the container sidewall. The first and second feet provide sighting lines external and internal the container for enabling the operator to determine the level of the material internal the container relative to markings on the external surface of the sidewall of the container.

In a more specific embodiment of the invention, the handle comprises lip extensions on each end thereof for accommodating the index and middle finger of operator while the thumb of the operator is disposed on a top surface of the handle for facilitating installation of the device on the container. The terminal ends of the bottom portion of the first and second legs may be beveled to facilitate separation of the first and second legs upon insertion over the edge of the container sidewall. The first and second feet in the preferred embodiment extend in opposite directions relative to one another, forming sighting lines therealong. The bottom surfaces of the first and second leg are preferably tapered for establishing a single line of sight along the first and second feet.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
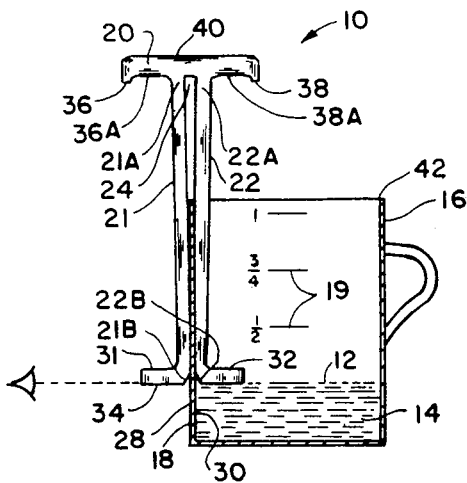
FIG. 1 is a front view partially in section of device of the present invention resiliently affixed to a container.

FIGS. 1–4 illustrate a device 10 for visually sighting the level 12 of a liquid material or a solid particulate material 14 within a container 16 having container sidewalls 18. In this embodiment, the sidewalls 18 are shown as transparent but the present invention is also useful for containers having opaque sidewalls. The container 16 may be a conventional glass or plastic container typically having measurement lines 19 disposed on the sidewall for measuring the volume of the material 14 internal the container 16. Unfortunately, many of marking lines on containers are ineffective for very accurate measurement, as well as being ineffective for operators with poor or impaired vision or under insufficient lighting conditions. Accordingly, the device 10 provides an aid for an operator for accurately determining the level 12 of the material 14 internal the container 16.

Figures 2, 3, 4:
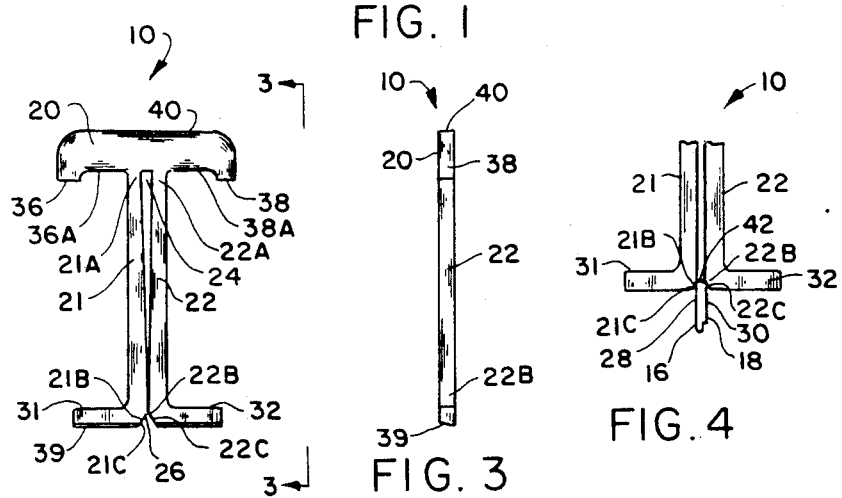
FIG. 2 is a front elevational view of the liquid level measuring device.
FIG. 3 is a side view along line 3—3 of FIG. 2.
FIG. 4 is an enlarged view of the lower portion of the device of FIGS. 2 and 3 being applied to the sidewall of a liquid container.

The device 10 comprises a handle 20 and a first and a second leg 21 and 22. The first leg 21 has a first top end portion 21A and a first bottom end portion 21B, whereas the second leg 22 has a second top end portion 22A and a second bottom end portion 22B. The first and second top end portions 21A and 22A are integrally connected to the handle 20 and are spaced apart a distance 24 to accommodate the thickness of the container sidewall 18. The first and second legs 21 and 22 extend from the handle 20 at a converging relationship with the first and second bottom end portions 21B and 22B spaced a distance apart 26, which is closer than the distance 24. The handle 20 and the first and second legs 21 and 22 are preferably made of a resilient material, such as plastic, enabling the first and second bottom end portions 21B and 22B to be separated upon positioning the first and second legs 21 and 22 on the external 28 and internal 30 surfaces of the container sidewall 18, as shown in FIG. 4. The resiliency of the first and second legs 21 and 22 further enables the first and second legs 21 and 22 to resiliently engage the external and internal sidewall surfaces 28 and 30 for maintaining the position of the first and second bottom end portions 21B and 22B relative to the container sdiewall 18 and the markings 19. First and second feet 31 and 32 are integrally connected to the first and second legs 21 and 22, respectively, and extend in opposite directions relative to one another, forming a sighting line 34 therealong. The sighting line extends both external and internal the container 16 for enabling the operator to determine the level 12 of the material 14 internal the container 16 upon sighting along the first and second feet 31 and 32 through a transparent container sidewall 18. When used with an opaque container sidewall, the first foot 31 may be adjusted adjacent the appropriate marking 19 enabling the second foot 31 to indicate the appropriate level 12 for the material 14 internal the container.

The handle 20 preferably includes lip extensions 36 and 38 on each end thereof for providing spaces 36A and 38A to accommodate the index finger and middle finger of the operator with the thumb of the operator (not shown) being disposed on a top surface 40 for facilitating installation of the device 10.

The first and second bottom end portions ends 21B and 22B of the first and second legs 21 and 22 are beveled at 21C and 22C to facilitate separation of the first and second legs 21 and 22 upon inserting over the edge 42 of the container sidewall as shown in FIG. 4.

Each of the first and second legs 21 and 22 is tapered, as shown in FIG. 2 with the top end portions 21a and 22A having a smaller cross-section than the cross-section of the bottom end portions 21B and 22B to facilitate the flexing of the legs 21 and 22. The first and second feet 31 and 32 have taper 39 as shown in FIGS. 2 and 3 to provide a single sighting line 34 therealong.

The operation of the device 10 should be readily apparent from the foregoing description. For a transparent container sidewall, the operator first determines the level desired within the container 16 from the markings 19 on the transparent sidewall 18 thereof. The device 10 is then grasped by the operator as heretofore described and is inserted over the edge 42 of the sidewall 18 of the container 16 as shown in FIG. 4, with the first foot 31 extending external the container 16 and the second foot 32 extending internal the container 16. Bevels 21C and 22C facilitate the insertion of the first and second legs 21 and 22 on the liquid container 16. Thereafter, the device 10 is positioned to be adjacent one of the desired material level markings 19, whereat the resilient legs 21 and 22 maintain the position of the device 10 relative to the transparent sidewall 18 of the container 16. It should be appreciated that this process may be accomplished under proper illumination.

Thereafter, the operator may fill the container 16 with the material and sight along the first and second feet 31 and 32 until the material level contacts the second foot 32 internal the container. It should be appreciated that the present invention eliminates any refractive error by virtue of the sighting along the sighting line 34 which is perpendicular to the container sidewall 18. In addition, any error due to the minescus of a liquid material adjacent the internal sidewall 30 of the container 16 is also eliminated by the present invention.

When using a container with an opaque container sidewall, the device 10 is positioned on the container as set forth above. Thereafter, the operator may fill the container 16 with the material until the material level 12 contacts the second foot 32 internal the container 16 by visually sighting the interior of the container.

Figure 5:
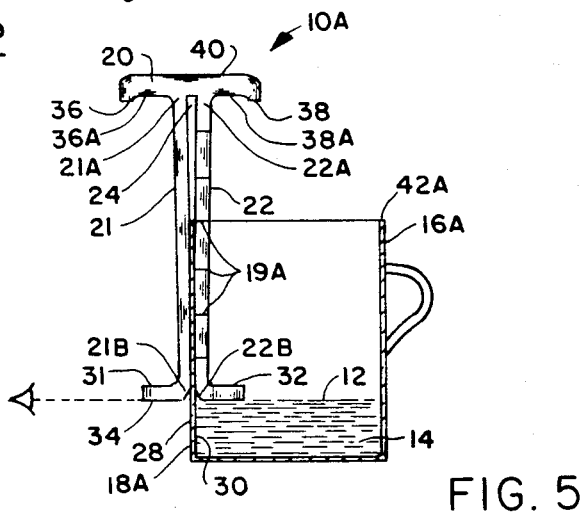
FIG. 5 is a variation of the invention shown in FIGS. 1–4 wherein the device incorporates an integral scale for use with a container of a known cylindrical diameter.

FIG. 5 illustrates a device 10A which is a variation of the invention shown in FIGS. 1-4 for use with a container of known diameter or a standard container 16A. In this embodiment, the container 16A is of a known or pre-established diameter, enabling the measurement of the vertical level of the material to determine the volume of the material within the container 16A. The marking lines 19A are disposed on the device 10A such that the level can be directly ascertained or preset by establishing the appropriate marking 19A adjacent the top edge 42A of the sidewall 18A of the container 16A. This embodiment would be valuable in a system wherein the device 10A is distributed with a standard container 16A or is custom made for a particular type of size of container. In addition, either a transparent or an opaque container sidewall may be used with this embodiment.

It should be appreciated by those skilled in the art that the present invention can be easily and readily fabricated from a unitary piece of plastic material having resilient properties. Accordingly, the device may be economically manufactured for retail distribution or used as a premium item and the like. The generally flat contour of the device enables the device to be readily affixed to the exterior of a container by suitable means, such as adhesives, shrink wrapping and the like.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A device for visually sighting the level of a liquid material or a solid particulate material within a container having a container sidewall with markings on an external surface of the container sidewall, comprising in combination:

a handle;

a first leg having a first top end portion and a first bottom end portion;

a second leg having a second top end portion and a second bottom end portion;

said first and second top end portions being integrally connected to said handle and spaced apart a distance to accommodate the thickness of the container sidewall;

said first and second legs extending from said handle in a converging relationship establishing the first and second bottom end portions to be spaced apart a distance closer than said first and second top end portions;

a first and a second foot integrally connected to said first and second bottom end portions with said first and second feet extending substantially perpendicular to said first and second legs respectively;

said first and second legs being resilient, enabling the first and second bottom end portions to be separated upon positioning the first and second legs on the external and internal surfaces of the container sidewall and for enabling said first and second bottom end portions to resiliently engage the external and internal surfaces of the container sidewall to maintain the position of said first and second bottom end portions relative to said container sidewall; and said first and second feet providing sighting lines external and internal the container for enabling an operator to determine the level of the material internal the container relative to the container sidewall marking or the external surface of the container sidewall.

2. A device as set forth in claim 1, wherein said handle comprises a lip extension on each of the ends thereof for accommodating the index and middle finger of an operator while the thumb portion of the operator is disposed on a top surface of the handle for facilitating installation of the device on the container.

3. A device as set forth in claim 1, wherein said first and second bottom end portions of the first and second legs are beveled to facilitate separation of the first and second legs upon insertion over the edge of the container sidewall.

4. A device as set forth in claim 1, wherein a bottom surface of each of the first and second feet is tapered for facilitating linear alignment of the first and second feet along said lines of sight.

5. A device as set forth in claim 1, wherein said first and second feet extend in opposite directions relative to one another, forming said sighting lines therealong.

6. A device as set forth in claim 1, wherein said bottom end portions of said legs have a larger cross section than the cross section of said top end portions of said legs.

7. A device as set forth in claim 1, including indicia marks disposed along one of said first and second legs.

* * * * *